United States Patent
Hawkins et al.

[11] Patent Number: 5,897,595
[45] Date of Patent: *Apr. 27, 1999

[54] SYSTEM AND METHOD FOR MANAGING ACCESS OF A FLEET OF MOBILE MACHINES TO A RESOURCE HAVING MULTIPLE ENTRY POINTS

[75] Inventors: Mark R. Hawkins, Chillicothe; Carl A. Kemner; Craig L. Koehrsen, both of Peoria, all of Ill.

[73] Assignee: Caterpillar Inc., Peoria, Ill.

[ * ] Notice: This patent is subject to a terminal disclaimer.

[21] Appl. No.: 08/770,208

[22] Filed: Dec. 19, 1996

[51] Int. Cl.⁶ .............................. G05D 1/00; G01C 22/00
[52] U.S. Cl. .............................. 701/23; 701/50; 340/909
[58] Field of Search .................. 701/23, 24, 50, 701/117, 213, 300, 301, 302; 340/430, 909, 910, 916; 342/454, 456

[56] References Cited

U.S. PATENT DOCUMENTS

| | | |
|---|---|---|
| 4,950,118 | 8/1990 | Mueller et al. ...................... 414/274 |
| 5,202,832 | 4/1993 | Lisy .................................... 364/424.02 |
| 5,219,036 | 6/1993 | Schwager et al. ...................... 180/164 |
| 5,280,431 | 1/1994 | Summerville et al. ............ 364/424.02 |
| 5,390,125 | 2/1995 | Sennott et al. .......................... 364/449 |
| 5,445,347 | 8/1995 | Ng ............................................ 246/169 |
| 5,586,030 | 12/1996 | Kemner et al. . |
| 5,602,739 | 2/1997 | Haagenstad et al. .................. 364/436 |
| 5,703,778 | 12/1997 | Takahashi et al. ...................... 364/437 |

*Primary Examiner*—William A. Cuchlinski, Jr.
*Assistant Examiner*—Tim Wyckoff
*Attorney, Agent, or Firm*—James R. Yee; W. Bryan McPherson, III

[57] ABSTRACT

The invention is a system and method for managing a resource having multiple entry points. Each mobile machine includes a queue manager for generating a queue position request upon approach to the resource. A resource manager establishes queues, one for each entry point to the resource, to control access to the resource. Upon receiving a queue position request from an approaching mobile machine, the resource manager determines which queue to place the mobile machine, and then generates a queue position and sends a queue position signal to the approaching mobile machine.

22 Claims, 7 Drawing Sheets

Fig_3_

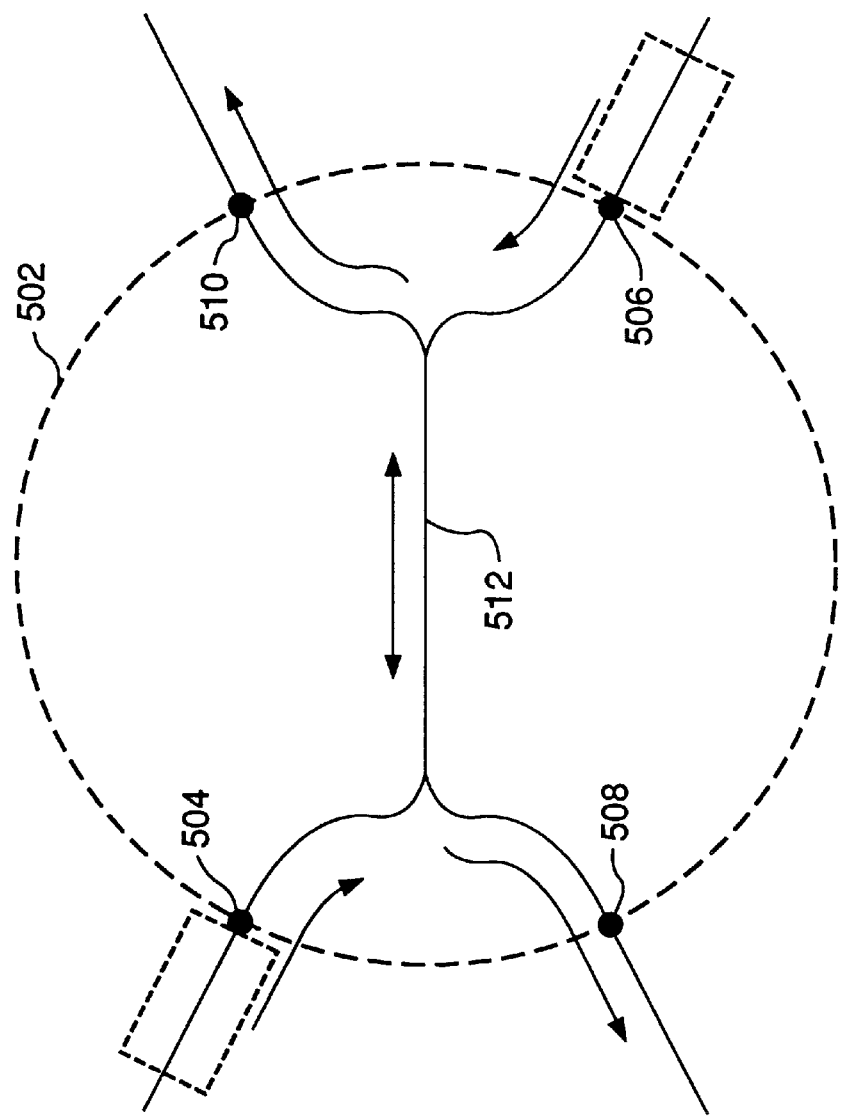

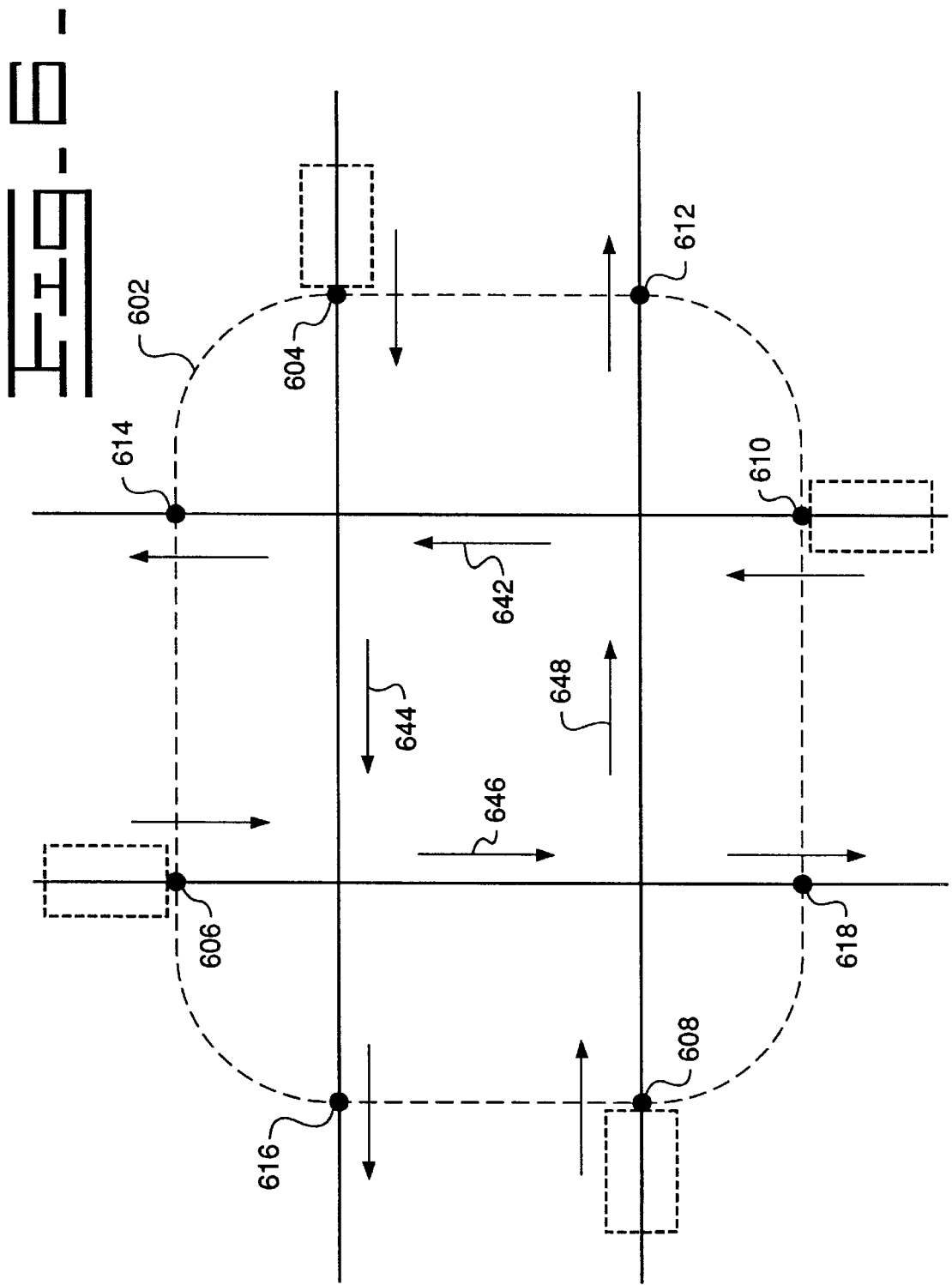

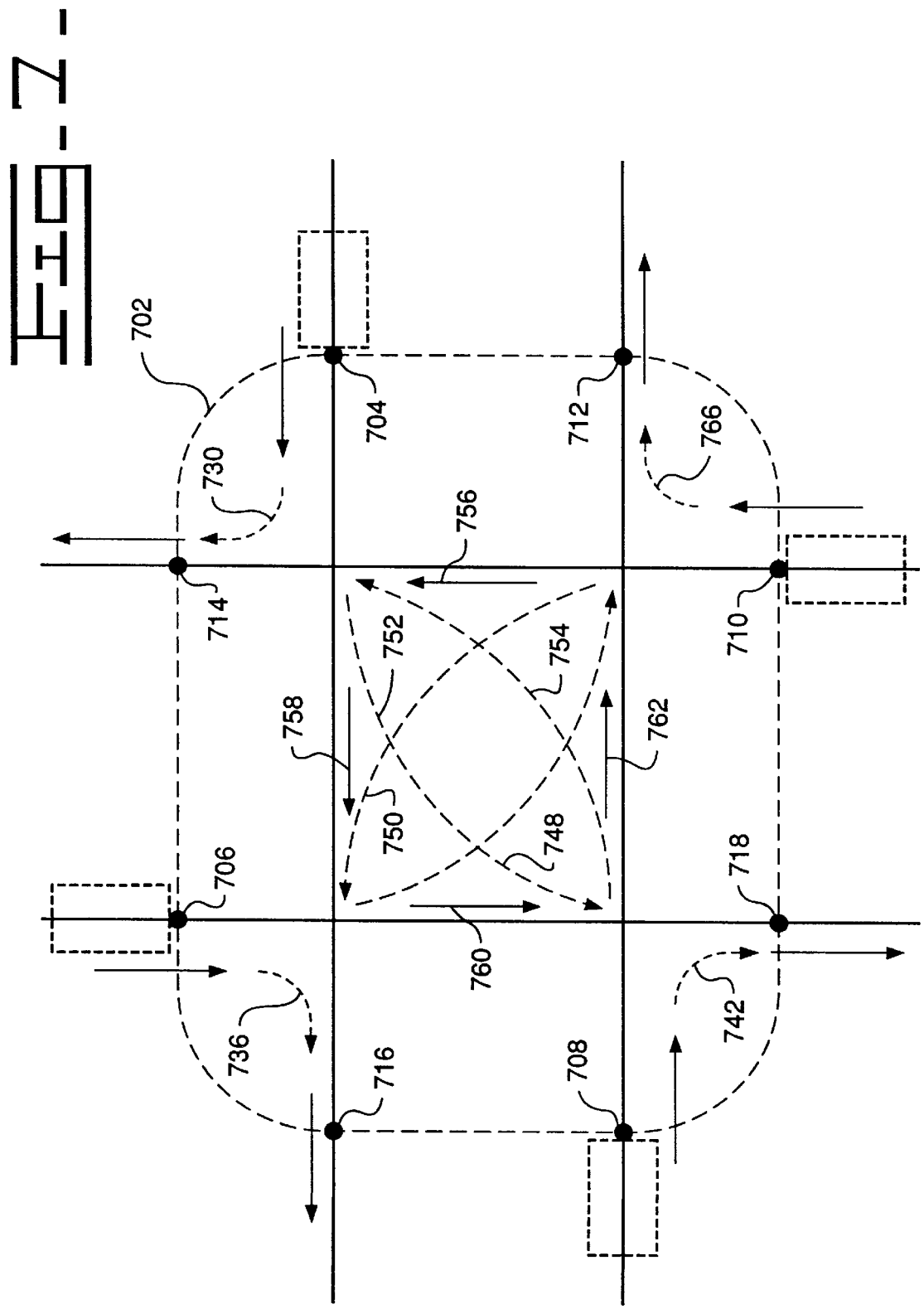

SYSTEM AND METHOD FOR MANAGING ACCESS OF A FLEET OF MOBILE MACHINES TO A RESOURCE HAVING MULTIPLE ENTRY POINTS

TECHNICAL FIELD

This invention relates generally to a system and method for managing a resource in a mobile machine system and, more particularly, to a system and method for managing access to a resource having multiple entry points, such as an intersection, by a plurality of mobile machines.

BACKGROUND ART

Caterpillar Inc. of Peoria, Ill., manufactures off-road mining mobile machines. For example, the Caterpillar 777C is an off-road mining truck. In commonly owned U.S. Pat. No. 5,390,125, Kyrtsos et al disclose an autonomous mobile machine system for use with a mining mobile machine such as the 777C truck. Such an autonomous mobile machine system may be used, for example, to implement an autonomous mining operation. For example, a plurality of autonomous dump trucks can haul rock from an excavation site to a crusher site in an open pit mining operation.

In addition, in commonly owned U.S. Pat. No. 5,586,030, Kemner et al disclose a system using a queuing technique to manage a single input, fixed position resource such as a wheel loader.

In such a mining system, resources such as intersections must be shared by a plurality of mobile machines. It is desired to manage the mobile machines and the resources so that operation of the mining system is optimized. This invention addresses the management of resources having multiple inputs, or entry points. For effective management of the resource, each entry point will require its own queue. For example, an intersection has at least one entry point and at least one exit point. Each entry point of the intersection requires a queue. Each queue must be appropriately managed, and all the queues for the intersection must be managed as a whole to effectively manage access to the intersection.

The present invention is directed to overcoming one or more of the problems as set forth above.

DISCLOSURE OF THE INVENTION

In one aspect of the present invention, a system for managing a resource shared by a plurality of mobile machines is provided. The resource has first and second entry points. The system includes a queue manager located on each mobile machine. The queue manager generates a queue position request signal in response to approaching the resource. The system also includes a resource manager which establishes first and second queues to control access to the resource. The first and second queues correspond to the first and second entry points, respectively. The resource manager receives the queue position request signal and responsively determines which queue to place the approaching mobile machine and the appropriate queue position within the selected queue.

In another aspect of the present invention, a method for managing a resource shared by a plurality of mobile machines is provided. The resource has a first and second entry point. Each mobile machine has a queue manager. The queue manager generates a queue position request signal in response to the mobile machine approaching the resource. The method includes the steps of establishing first and second queues to control access to the resource. The first and second queues correspond to the first and second entry points, respectively. A queue position request signal is received from an approaching mobile machine. A queue position within either the first or second queue is responsively determined. The queue position is communicated to the approaching mobile machine.

BRIEF DESCRIPTION OF THE DRAWINGS

FIG. 5 is an illustration of an intersection having two entry points, one intersection route, and two exit points;

FIG. 6 is an illustration of an intersection having four entry points, four intersection routes, and four exit points; and FIG. 7 is an illustration of an intersection having four entry points, twelve intersection routes, and four exit points.

BEST MODE FOR CARRYING OUT THE INVENTION

Figure 1:
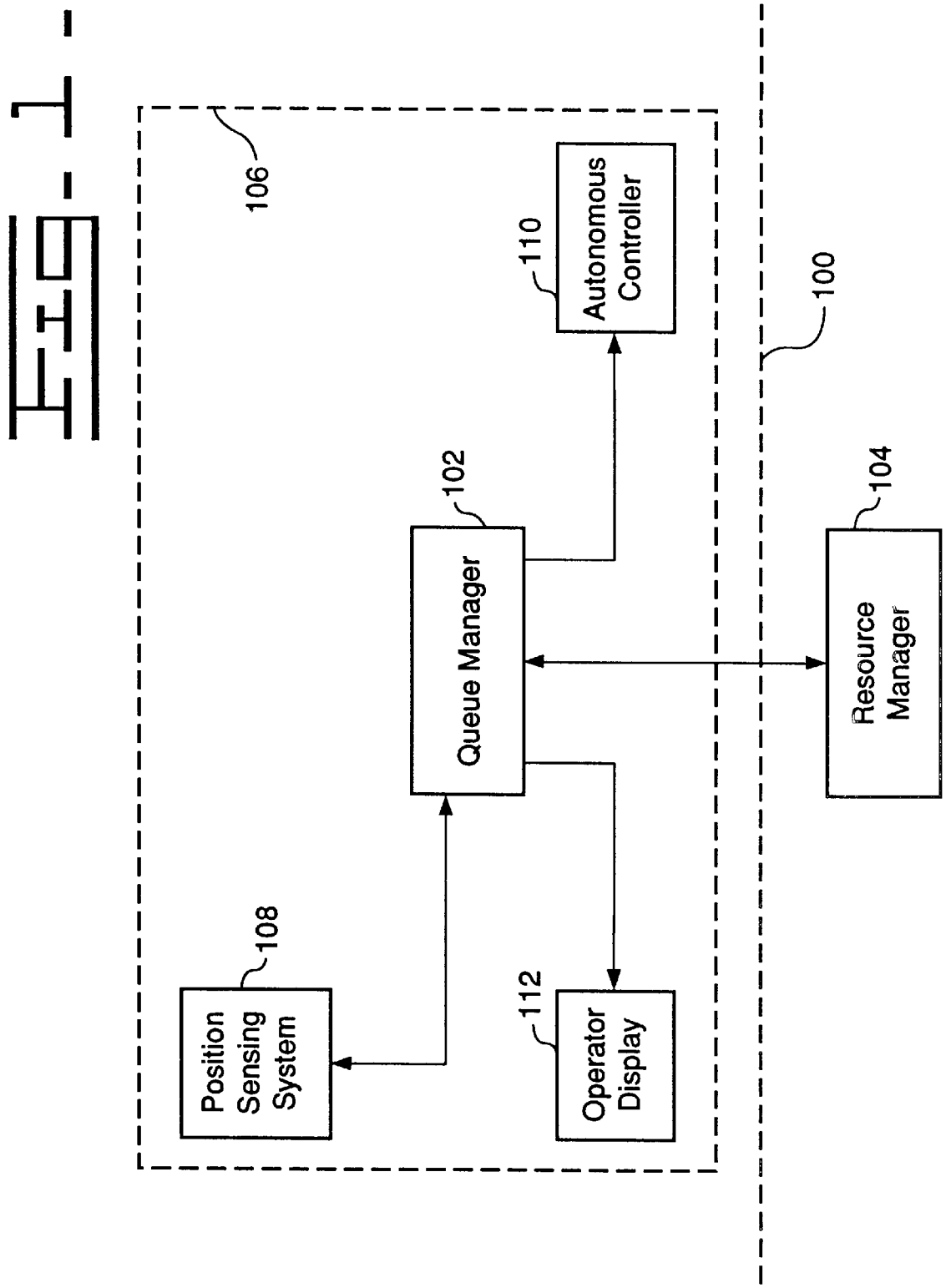
FIG. 1 is a high level block diagram illustrating an embodiment of the present invention.
Figure 2:
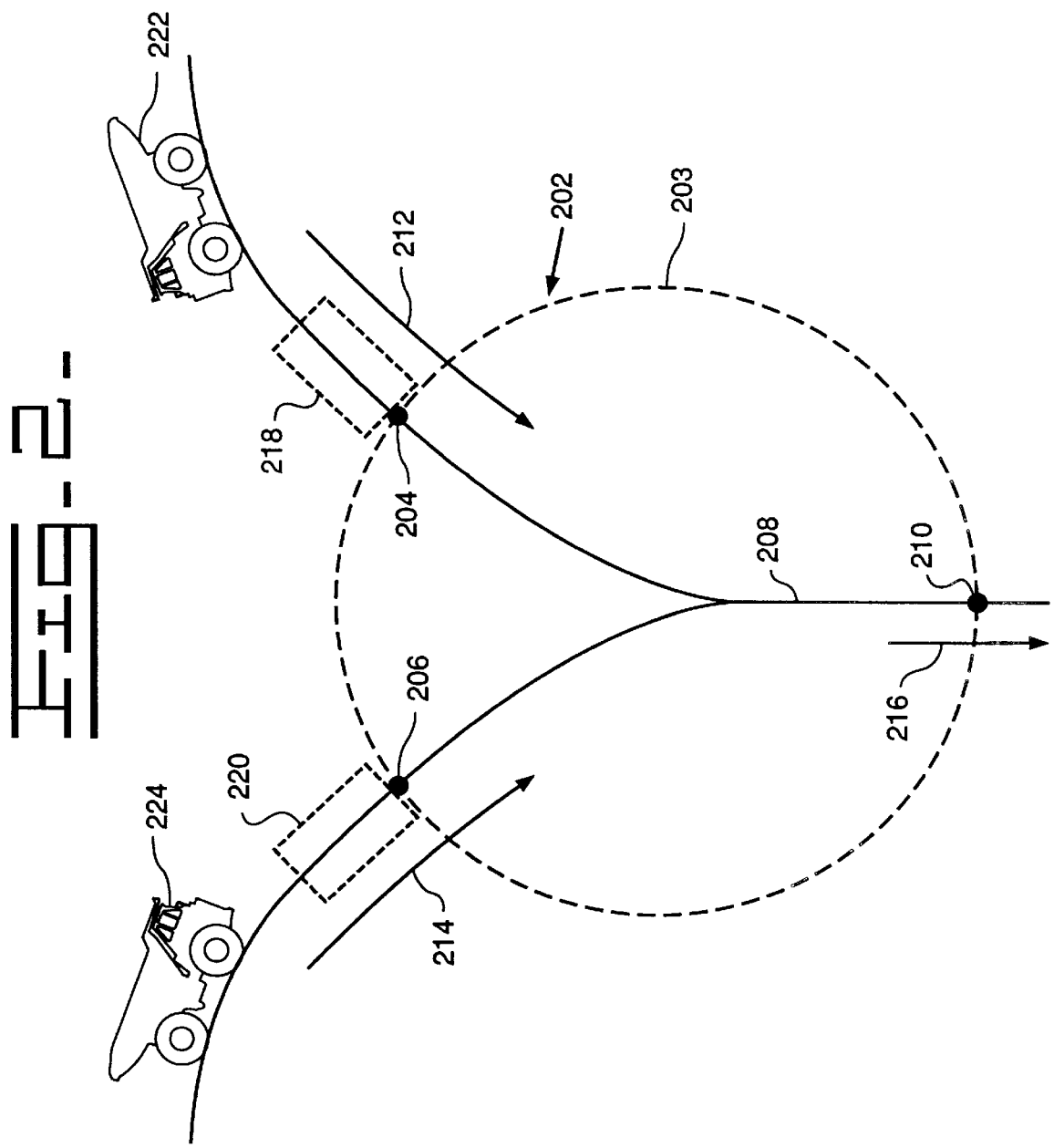
FIG. 2 is an illustration of an intersection having two entry points, one intersection route, and one exit point.

With reference to FIGS. 1 and 2, the present invention provides a system 100 for managing a resource 202 shared by at least one mobile machine 106. The resource 202 has a first entry point 204, a second entry point 206, and an exit point 210.

A queue manager 102, located on each mobile machine 106, generates a queue position request signal in response to the mobile machine 106 approaching the resource 202.

A resource manager 104 establishes first and second queues 218,220 to control access to the resource 202. The first and second queues 218,220 correspond to the first and second entry points 204,206, respectively. The resource manager 104 receives the queue position request signal and responsively determines a queue position in one of the first and second queues 218,220. The resource manager then sends a queue position signal to the approaching mobile machine.

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual system. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information relating to the queues to assist an operator during operation of the mobile machine 106.

In the preferred environment the resource 202 is an intersection 203. The resource manager 104 is used to control the traffic flow of mobile machines, such as dump trucks, through intersections at an open pit mining site. The resource manager 104 acts like a traffic guard, controlling access to the intersection 203 and tracking the progress of the mobile machines as they pass through the intersection 203. In the preferred embodiment, the resource manager 104 is located at a base station (not shown) near an open pit mining operation, and is a general purpose computer or workstation. The features of the resource manager 104 are performed in software programmed into the computer.

With reference to FIG. 2 in the preferred embodiment, the resource 202 is an intersection 203 and includes at least one intersection route 208. Arrows 212,214,216 indicate the direction of travel of the mobile machines 106 into and out of the intersection 203.

The resource manager 104 establishes one queue for each entry point of the intersection 203. In FIG. 2 there are two queues 218,220. These queues 218,220 are associated with the first and second entry points 204,206, respectively. As mobile machines approach the intersection 203, the resource manager 104 assigns them to a queue, and a position within that queue. When the intersection 203 is clear, the resource manager 104 determines which queue to allow access to the intersection 203. This decision is made by using a scheduling strategy which may take into account the priorities of the mobile machines 106 and when the mobile machines 106 arrive at the intersection 203.

After deciding which queue may access the intersection 203, the resource manager 104 decides when the selected queue may proceed through the intersection 203. The timing of the intersection access is important to ensure that multiple mobile machines 106 do not conflict with each other as they move through the intersection 203.

The resource manager 104 determines if multiple mobile machines 106 may simultaneously access the resource 202. Simultaneous access of the resource 202 may be allowed when the mobile machines 106 do not conflict with each other.

After permitting a mobile machine 106 to proceed, the resource manager 104 tracks the progress of the selected mobile machine 106 through the intersection 203. Once the mobile machine 106 has left the intersection 203, the resource manager 104 selects the next appropriate queue to allow access to the intersection 203.

Figure 3:
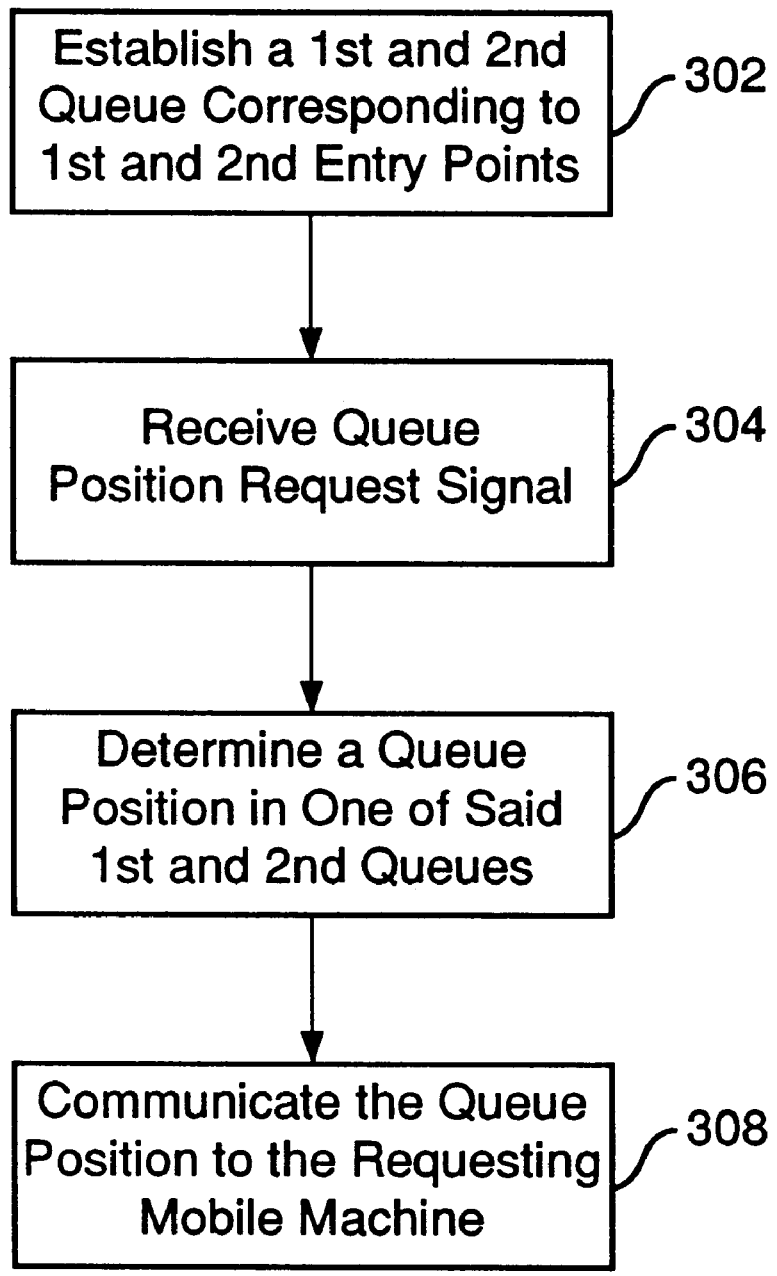
FIG. 3 is a high level flow diagram illustrating a method of managing an intersection.

A method of managing the intersection 203, according to one embodiment of the present invention, is illustrated in FIG. 3. In a first control block 302, the resource manager 104 establishes first and second queues 218,220 corresponding to the first and second entry points 204,206, respectively. In a second control block 304, the resource manager 104 receives a queue position request signal from an approaching mobile machine 106. Upon receiving the queue position request signal, the resource manager 104 responsively determines a queue position in one of the first and second queues 218,220, shown in a third control block 306. Then in a fourth control block 308, the resource manager 104 communicates the queue position to the requesting mobile machine 106.

In the preferred embodiment, during initialization the resource manager 104 accesses a database containing the configuration of the intersection 203. The intersection elements are defined in the database. For example, referring again to FIG. 2, the resource manager 104 determines that the intersection 203 has two entry points 204,206, one intersection route 208, and one exit point 210. Based on this information, the resource manager 104 establishes the queues 218,220 for the entry points 204,206, respectively. First and second mobile machines 222,224 are approaching the intersection 203. As the first mobile machine 222 approaches the intersection 203 it sends a queue position request signal to the resource manager 104. The queue position request signal is requesting the entry point 204, the intersection route 208, the exit route 210, and signifies that the first mobile machine 222 has a low priority. Based on this information, the resource manager 104 will time tag the request, assign the mobile machine 222 to the first queue 218, and determine and send a queue position signal to the first mobile machine 222. The queue position signal will contain information on the physical location of the first position in the first queue 218 and the number of mobile machines currently in the first queue 218, i.e., 0. The queue manager 102 on the first mobile machine 222 will use the information contained in the queue position signal to determine where to stop the mobile machine 222 to await further instructions from the resource manager 104. This same process is performed as the second mobile machine 224 approaches the second entry point 206. The queue position request signal sent by the second mobile machine 224 requests the entry point 206, the intersection route 208, the exit point 210, and signifies that the second mobile machine 224 has a medium priority.

The resource manager 104 then determines if the intersection 203 is available, i.e., that no other mobile machine 106 is currently in the intersection 203.

Figure 4:
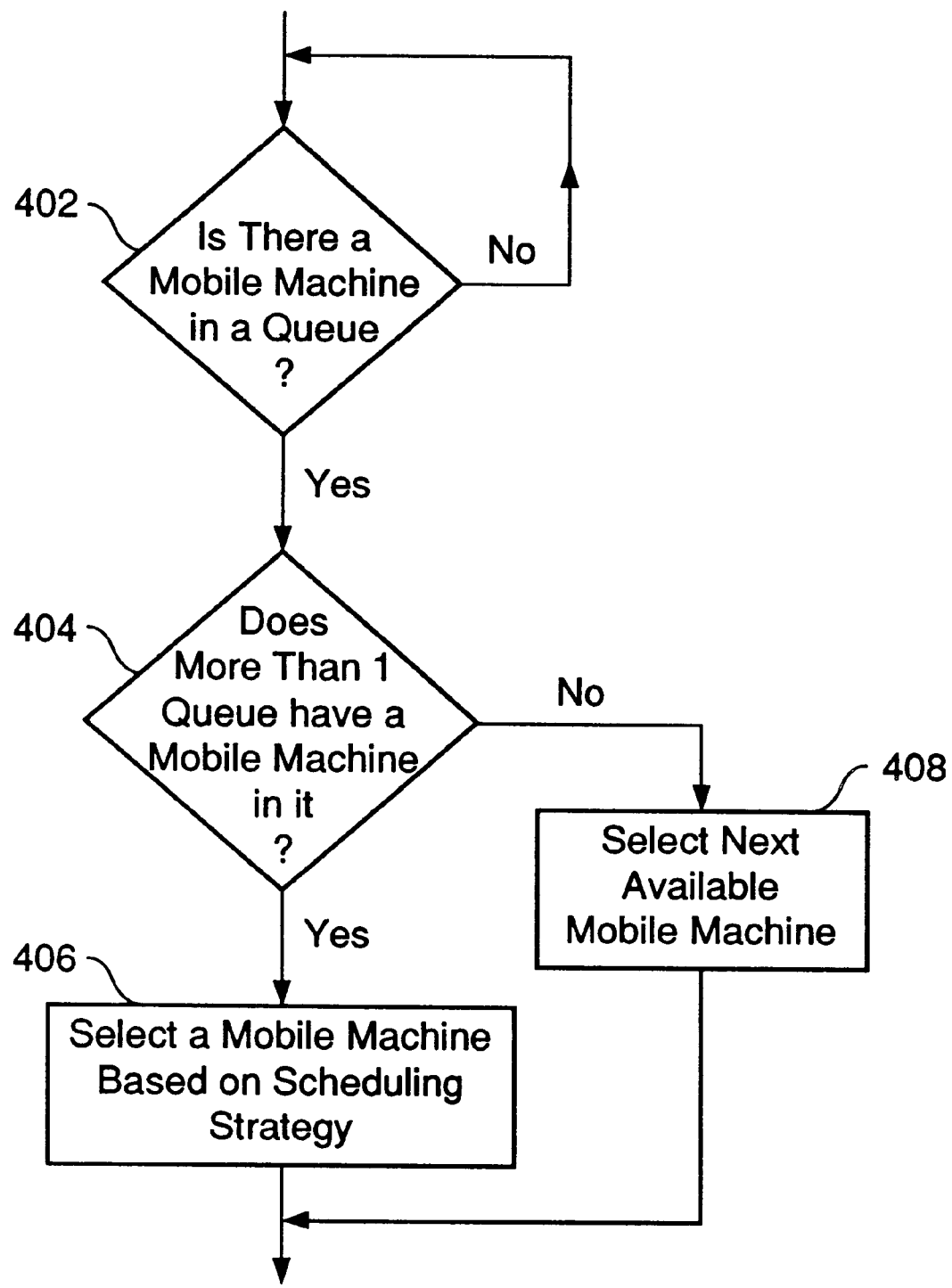
FIG. 4 is a high level flow diagram of the queue selection process.

With reference to FIG. 4, once the intersection 203 is available the resource manager 104 determines if a mobile machine 106 is waiting to access the intersection 203 in a first decision block 402. In a second decision block 404, the resource manager 104 determines if multiple queues 218, 220 have mobile machines 106 in them. If multiple queues 218,220 have mobile machines 106 requesting access to the intersection 203, the resource manager 104 determines in a first control block 406 which queue to allow access to the intersection 203 first. This is accomplished according to a scheduling strategy. For example, a first in, first out scheduling strategy would permit the first mobile machine 222 of the first queue 218 to go first since it arrived shortly before the second mobile machine 224. However, if the decision was made based on priority, then the second mobile machine 224 would be permitted to go first. For this example, we will assume that a scheduling strategy based solely on priority is used. Therefore the second mobile machine 224 will be permitted to go first. If only one mobile machine 106 had been in one of the queues 218,220 then, in a second control block 408, that mobile machine 106 would have been selected.

Once a decision is made to let the second mobile machine 224 access the intersection 203, the resource manager 104 must determine when to allow the second mobile machine 224 to access the intersection 203. This is done by ensuring that no other mobile machine 106 is accessing the intersection 203, which may be in conflict with the second mobile machine 224. Once the resource manager 104 determines to allow the second mobile machine 224 to access the intersection 203, it sends a depart queue position signal to the second mobile machine 224. The second mobile machine 224 responsively sends a leave queue position signal to the resource manager 104 and begins to move forward through the intersection 203. The resource manager 104 may now determine if any other mobile machine 106 can access the intersection 203 without conflicting with the second mobile machine 224. Since the intersection 203 only has one intersection route 208, mobile machine 106 may not simultaneously access the intersection 203.

As the second mobile machine 224 leaves the intersection 203 a leave intersection signal is sent to the resource manager 104. Upon receiving the leave intersection signal the resource manager 104 will select the next queue to allow access to the resource 202.

It can be appreciated that the actual order of the steps may be varied without deviating from the present invention. For example, determining when to check to see if the intersection 203 is available can be done by at least one of two methods. One method is to check the resource availability before selecting a queue to access the resource 202. This enables the resource manager 104 to wait longer before it has to make a selection, which would enable any mobile machine 106 which arrived while the resource manager 104 was waiting for the intersection 203 to become available to be considered. In an alternative method, selecting the next queue to access the intersection 203 before checking the availability of the resource 202 will minimize the delay in allowing the selected mobile machine 106 to access the resource 202 when it becomes available.

There are a large variety of scheduling strategies which can be used to determine which queue to select when multiple queues 218,220 have mobile machines 106. The scheduling strategy could simply be based on the priority of the first mobile machine 106 in each queue 218,220, or it could be more complex and take into account the request of all the mobile machines 106 in each of the queues 218,220 to determine which queue to select first. For example, if the first queue 218 also contained a third mobile machine (not shown) and the third mobile machine had a high priority, then the scheduling strategy could permit the first queue 218 to access the resource 202 twice in succession so that the third mobile machine could access the intersection 203 as soon as possible.

Examples of types of factors which may be taken into account to determine priorities include, but are not limited to, a loaded mobile machine having priority over an unloaded mobile machine, a mobile machine requiring maintenance or fuel, and priority being given to all mobile machines working on a particular task. Other factors may be taken into account such as the length of time the mobile machine 106 has been waiting in the queue to access the resource 202.

A precision tracking scheme could be used which would enable the progress of mobile machines traveling through the intersection 203 to be tracked very accurately. This would enable mobile machines to be spaced closer together as they proceed through the intersection instead of waiting until the selected mobile machine has left the intersection before sending the next mobile machine into the intersection 203.

If any problems occur, e.g., a mobile machine stalls in the intersection, then the resource manager 104 may deliver an emergency stop signal which will cause all the mobile machines accessing the resource to stop until the problem is resolved.

The invention disclosed has been explained in detail with respect to an intersection 203 having two entry points 204,206, a single intersection route 208, and one exit point 210. The system and method disclosed applies equally well to complex resources such as shown in FIGS. 5, 6, and 7. FIG. 5 illustrates an intersection 502 with two entry points 504,506, one bi-directional intersection route 512, and two exit points 508,510. FIG. 6 illustrates an intersection 602 with four entry points 604,606,608,610, four intersection routes 642,644,646,648, and four exit points 612,614,616, 618. FIG. 7 illustrates an intersection 702 with four entry points 704,706,708,710, twelve intersection routes 730,736, 742,748,750,752,754,756,758,760,762,766, and four exit points 712,714,716,718.

INDUSTRIAL APPLICABILITY

The invention has been described in the environment of an autonomous mining system. The resource manager 104 is responsible for controlling intersections throughout the mining system. Queues are set up and managed by the resource manager 104 to control mobile machine access to each intersection. As will be apparent to a person skilled in the relevant art, however, the invention may be used to manage a shared resource in other environments. For example logging sites, or warehouses using autonomous machines can benefit from the disclosed invention.

Other aspects, objects, and features of the present invention can be obtained from a study of the drawings, the disclosure, and the appended claims.

We claim:

1. A system for managing a resource shared by at least one mobile machine, said resource including a first entry point and a second entry point, comprising:

a queue manager located on each of said at least one mobile machine, said queue manager being adapted to generate a queue position request signal in response to one of said at least one mobile machine approaching said resource; and a resource manager adapted to establish a first queue and a second queue to control access to said resource, said first queue and said second queue corresponding to said first entry point and said second entry point respectively, said resource manager being adapted to receive said queue position request signal and responsively determine a queue position in one of said first queue and said second queue and responsively communicate a queue position signal to said one of said at least one mobile machine.

2. A system, as set forth in claim 1, wherein said resource manager is adapted to determine one of said first queue and said second queue to allow access to said resource.

3. A system, as set forth in claim 1, wherein said resource manager is adapted to allow one of said first queue and said second queue access to said resource in response to a condition of said resource.

4. A system, as set forth in claim 1, wherein said queue position request signal includes data disclosing a mobile machine identification, a mobile machine priority, and a requested route.

5. A system, as set forth in claim 1, wherein said resource manager is adapted to associate a time tag to received said queue position request signal.

6. A system, as set forth in claim 1, wherein said queue position signal includes data disclosing an entry point position and a determination of a number of mobile machines in one of said first queue and said second queue, and wherein said queue manager is adapted to determine said queue position in response to said queue position signal.

7. A system, as set forth in claim 1, wherein said resource is an intersection.

8. A system, as set forth in claim 7, wherein said resource manager is adapted to determine a configuration of said intersection.

9. A system, as set forth in claim 8, wherein said intersection also includes at least one intersection route and at least one exit point.

10. A system, as set forth in claim 1, wherein said resource manager is adapted to selectively deliver a blocking signal to prevent said mobile machines in said first queue and second queue from accessing said intersection.

11. A method for managing a resource shared by at least one mobile machine, each of said at least one mobile machine including a queue manager, said queue manager being adapted to generate a queue position request signal in response to said one of said at least one mobile machine approaching said resource, said resource including a first entry point and a second entry point, the method comprising:

establishing a first queue and a second queue to control access to said resource, said first queue and said second queue corresponding to said first entry point and said second entry point, respectively;

receiving a queue position request signal from said one of said at least one mobile machine;

responsively determining a queue position in one of said first queue and said second queue; and communicating said queue position to said one of said at least one mobile machine.

12. A method, as set forth in claim 11, wherein responsively determining a queue position includes determining said queue position in response to a determination of the number of said mobile machines in one of said first queue and said second queue.

13. A method, as set forth in claim 11, including the steps of:

determining a condition of availability of said resource to receive said one of said at least one mobile machine;

determining one of said first queue and said second queue to allow access to said resource; and determining when to allow said one of said first queue and said second queue to access said resource.

14. A method, as set forth in claim 11, including the step of defining said resource as an intersection.

15. A method, as set forth in claim 14, including the step of determining a configuration of said intersection.

16. A method, as set forth in claim 15, wherein determining a configuration includes the steps of determining said first entry point and said second entry point, determining at least one intersection route, and determining at least one exit point.

17. A method, as set forth in claim 11, including the step of said queue position request signal delivering data disclosing a mobile machine identification, a mobile machine priority, and a requested route.

18. A method, as set forth in claim 11, including the step of associating a time tag with said queue position request signal.

19. A method, as set forth in claim 13, wherein the step of determining one of said first queue and said second queue to allow access to said resource is performed in response to a scheduling strategy.

20. A method, as set forth in claim 19, including the step of determining said scheduling strategy as a function of said mobile machine priority and said time tag.

21. A method, as set forth in claim 11, including the step of selectively enabling a first and a second mobile machine to access said resource simultaneously.

22. A method, as set forth in claim 11, wherein communicating said queue position includes the step of communicating data disclosing an entry point position and a determination of a number of said mobile machines in one of said first queue and said second queue, and wherein said queue manager is adapted to determine said queue position as a function of said entry point position and said number of said mobile machines.

* * * * *